J. L. ROLLAND.
Bake Oven.

No. 13,855.

3 Sheets—Sheet 1.

Patented Nov. 27, 1855.

J. L. ROLLAND.
Bake Oven.
No. 13,855.
3 Sheets—Sheet 2.
Patented Nov. 27, 1855.
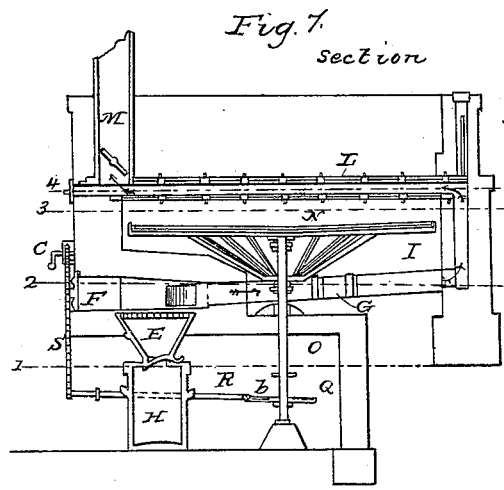
Fig. 7. Section
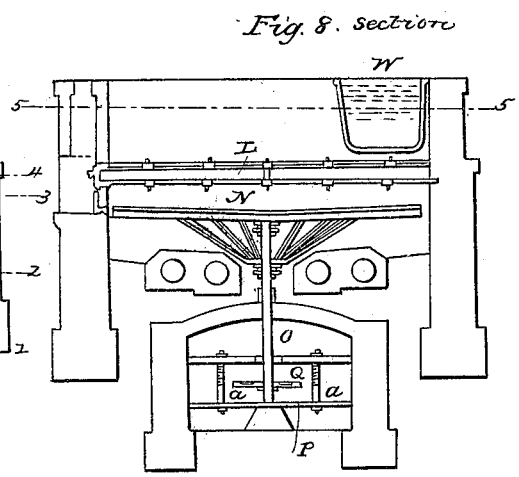
Fig. 8. Section
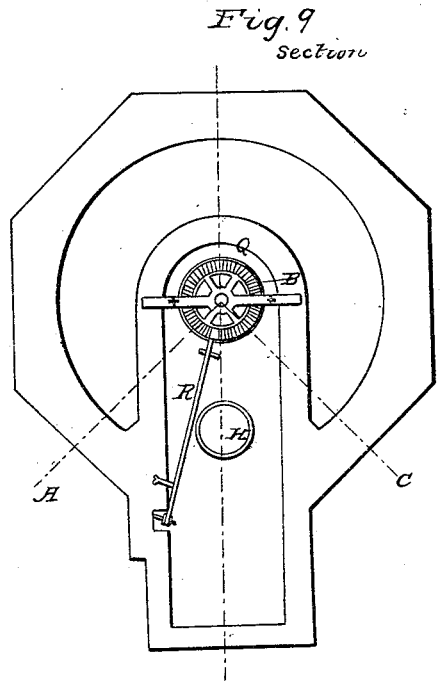
Fig. 9. Section
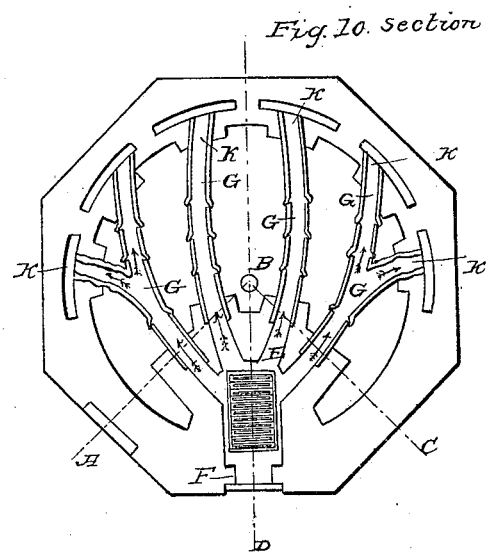
Fig. 10. Section J. L. ROLLAND.
Bake Oven.
No. 13,855.
3 Sheets—Sheet 3.
Patented Nov. 27, 1855.
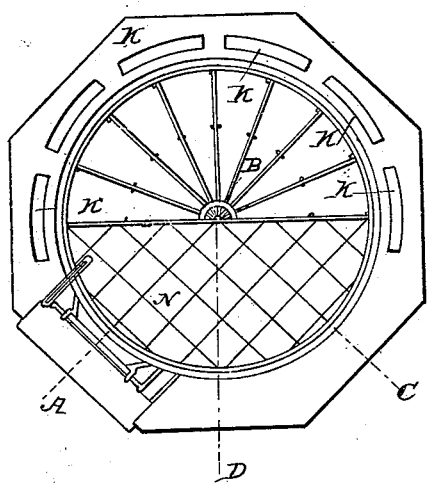
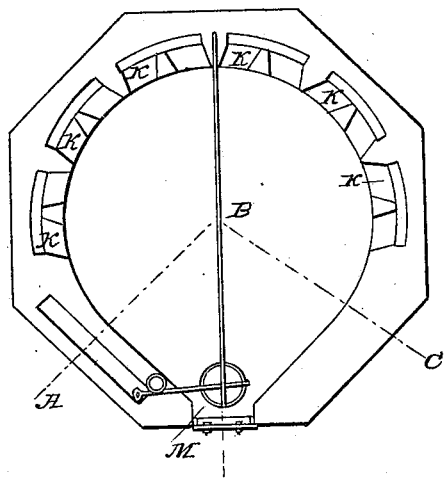
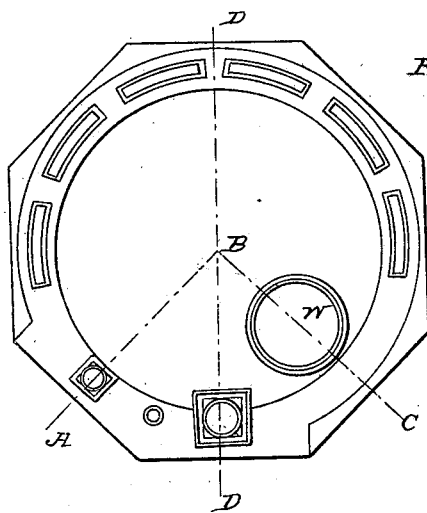

ns in which

UNITED STATES PATENT OFFICE.

JEAN LOUIS ROLLAND, OF PARIS, FRANCE.

OVEN FOR BAKING BREAD AND OTHER ALIMENTS.

Specification of Letters Patent No. 13,855, dated November 27, 1855.

*To all whom it may concern:*

Be it known that I, JEAN LOUIS ROLLAND, of Paris, in the Empire of France, have invented certain new and useful Improvements in Ovens for Baking Bread and other Aliments, of which the following is a full, clear, and exact description, reference being had to the annexed drawings, making part of this specification, in which—

Figure 1:
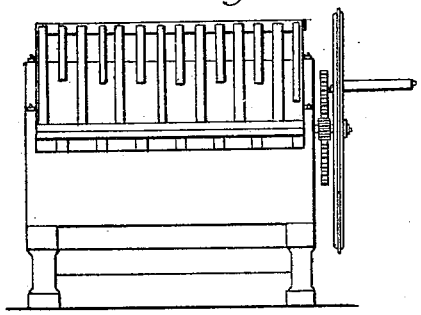
Figure 2:
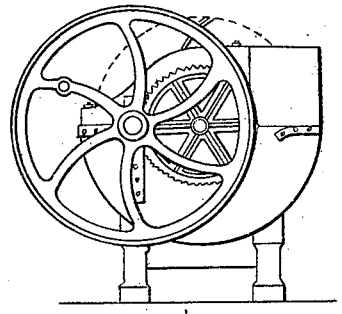
Figure 3:
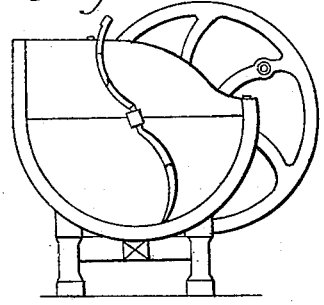
Figure 4:
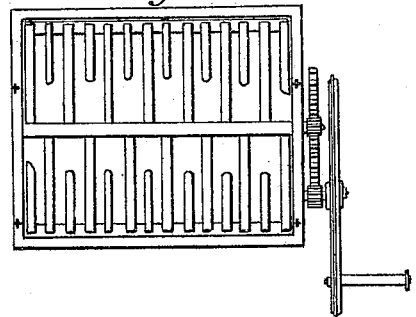
Figure 5:
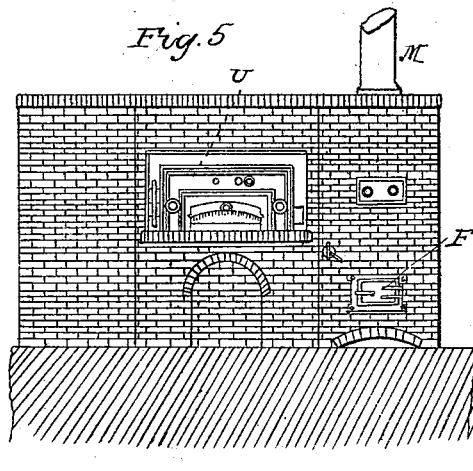
Figure 6:
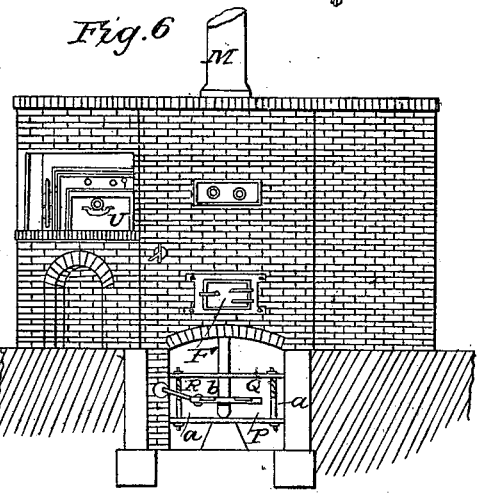

Figures 1, 2, 3, and 4 represent the kneading trough for the preparation of the dough, which however forms no part of my present invention; Figs. 5, and 6, elevations of the oven which I employ in baking; Fig. 7, a vertical section through the center of the furnace upon the line D, D; Fig. 8, a vertical section upon the line A, B, C, of Figs. 9, to 13; Fig. 9, a horizontal section of the furnace upon the line 1, 1, of Fig. 7. Fig. 10, a section through the smoke flues upon the line 2, 2, of Fig. 7. Fig. 11, a horizontal section immediately above the baking floor upon the line 3, 3, of Fig. 7. Fig. 12, a horizontal section through the hot air chamber above the oven upon the line 4, 4, of Fig. 7. Fig. 13, a plan of the furnace.

In ovens for baking bread and other aliments as heretofore constructed the fire is first built within the chamber in which the articles to be cooked are placed after the fire is removed. This method is liable to several objections which it is the object of my present improvements to remove.

To enable others skilled in the art to understand my invention I will proceed to describe the manner in which I have carried it out.

In the accompanying drawings E is the fire grate, F, the fire door, H the ash pit. The products of combustion as they leave the grate bars pass by the horizontal metallic flues G, through the chamber I, immediately beneath the oven floor, thence through the vertical conduits K, into the horizontal hot air chamber L, over the baking floor, whence they pass off through the chimney M. The baking floor N, is attached to the vertical shaft O which is stepped into the horizontal bar P (Figs. 6, and 8,) which may be raised or lowered by the screws a, to adjust the baking floor to the required height.

Q, is a cog wheel upon the shaft O which engages with a pinion b upon the shaft R. This shaft is set in motion by a chain S, operated by the crank c. By means of these connections the baking floor N, is rotated as desired for the double purpose of feeding the bread to the oven with facility and of subjecting it equally to the heat. The baking floor is thus constantly surrounded above and below by an atmosphere of heated air the temperature of which may be regulated by means of a damper at the bottom of the chimney, in connection with a thermometer suitably placed within the oven, to the exact degree required, while the smoke and products of combustion are entirely excluded therefrom. Above the hot air chamber L the furnace is packed with earth, sand or other nonconductor of heat. Into this packing is set the kettle W in which hot water is kept constantly on hand.

A furnace thus constructed may be kept constantly in operation, baking 30 batches of bread in the 24 hours, the baking being performed with the utmost regularity and despatch.

What I claim as my invention and desire to secure by Letters Patent is—

The arrangement of the horizontal flues G within the hot air chamber I and beneath the baking floor N, operating in the manner substantially as herein set forth.

JEAN LOUIS ROLLAND.

Witnesses:
GARNIER,
W. S. CHASE.